US009391673B2

(12) United States Patent
Kanemoto

(10) Patent No.: US 9,391,673 B2
(45) Date of Patent: Jul. 12, 2016

(54) INFORMATION PROCESSING APPARATUS, POWER SOURCE CONTROL METHOD OF INFORMATION PROCESSING APPARATUS AND PROGRAM

(75) Inventor: Toshinori Kanemoto, Kanagawa (JP)

(73) Assignee: Sony Corporation (JP)

( * ) Notice: Subject to any disclaimer, the term of this patent is extended or adjusted under 35 U.S.C. 154(b) by 304 days.

(21) Appl. No.: 14/001,222

(22) PCT Filed: Feb. 7, 2012

(86) PCT No.: PCT/JP2012/052750
§ 371 (c)(1),
(2), (4) Date: Aug. 23, 2013

(87) PCT Pub. No.: WO2012/117814
PCT Pub. Date: Sep. 7, 2012

(65) Prior Publication Data
US 2013/0331047 A1 Dec. 12, 2013

(30) Foreign Application Priority Data
Mar. 1, 2011 (JP) ................................. 2011-044273

(51) Int. Cl.
H04B 5/00 (2006.01)
H04W 52/02 (2009.01)
G06F 1/32 (2006.01)

(52) U.S. Cl.
CPC ............ H04B 5/0031 (2013.01); G06F 1/3228 (2013.01); G06F 1/3278 (2013.01); H04W 52/0229 (2013.01); Y02B 60/126 (2013.01); Y02B 60/50 (2013.01)

(58) Field of Classification Search
CPC ............ H04B 5/0031; H04W 52/0229; G06F 1/3278; G06F 1/3228
See application file for complete search history.

(56) References Cited

U.S. PATENT DOCUMENTS 6,668,329 B1* 12/2003 Rudd .................... H04B 10/114
709/232
7,072,697 B2* 7/2006 Lappetelainen .. H04W 52/0229
455/343.5

(Continued)

FOREIGN PATENT DOCUMENTS

CN 101815133 A 8/2010
CN 101950198 A 1/2011

(Continued)

OTHER PUBLICATIONS

Japanese Office Action for JP Application No. 2011044273, dated May 7, 2015.

(Continued)

Primary Examiner — Stefan Stoynov
(74) Attorney, Agent, or Firm — Lerner, David, Littenberg, Krumholz & Mentlik, LLP

(57) ABSTRACT

Provided is an information processing apparatus including an IC module that performs communication with an external apparatus, a detection unit that detects an electric wave, a timer that measures a time course after being started, a power supply unit that supplies a power source to the IC module, and a control unit that controls a supply amount of the power source based on a detection result of the electric wave and a determination result of a value of the timer. The control unit starts the timer after terminating communication with the external apparatus, restarts the timer every time a transmission start of an electric wave is detected, in response to detection of an electric wave received from an outside at a predetermined interval in the detection unit.

9 Claims, 12 Drawing Sheets

(56) References Cited

U.S. PATENT DOCUMENTS

| | | | |
|---|---|---|---|
| 7,301,950 B1 * | 11/2007 | Cheong | H04W 52/0219 370/252 |
| 7,359,367 B2 * | 4/2008 | Miyamoto | H04L 7/042 370/321 |
| 7,995,034 B2 * | 8/2011 | Pope | G06F 1/3215 345/163 |
| 8,270,932 B2 * | 9/2012 | Kim | H04W 52/0216 370/318 |
| 2010/0064152 A1 | 3/2010 | Kosaka | |
| 2010/0232331 A1 * | 9/2010 | Son | H04L 1/188 370/311 |

FOREIGN PATENT DOCUMENTS

| | | |
|---|---|---|
| JP | 2001005922 A | 1/2001 |
| JP | 2001101351 A | 4/2001 |
| JP | 2003-101464 A | 4/2003 |
| JP | 2009205538 A | 9/2009 |
| JP | 2010-067075 A | 3/2010 |
| WO | 03069934 A1 | 8/2003 |
| WO | 2005027034 A1 | 3/2005 |

OTHER PUBLICATIONS

EP Communication pursuant to Article 94(3) EPC for EP Application No. 12752091.4 dated Jan. 5, 2016.

* cited by examiner

INFORMATION PROCESSING APPARATUS, POWER SOURCE CONTROL METHOD OF INFORMATION PROCESSING APPARATUS AND PROGRAM

CROSS-REFERENCE TO RELATED APPLICATION

The present application is a national phase entry under 35 U.S.C. §371 of International Application No. PCT/JP2012/052750 filed Feb. 7, 2012, published on Sep. 7, 2012, as WO 2012/117814 A1, which claims priority from Japanese Patent Application No. JP 2011-044273 filed in the Japan Patent Office on Mar. 1, 2011.

TECHNICAL FIELD

The present invention relates to an information processing apparatus, a power source control method of the information processing apparatus and a program.

BACKGROUND ART

In recent years, an IC module that can transmit and receive communication information by near field communication becomes common, and an information processing apparatus mounting the IC module is also developed. The IC module transmits and receives communication information with an external apparatus such as a reader and a writer by electromagnetic waves as a medium. Although there is a case where a power source for driving is supplied to the IC module by the electromagnetic waves as a medium, a power source from the information processing apparatus is also supplied.

CITATION LIST

Patent Literature

Patent literature 1: JP 2010-067075A

SUMMARY OF INVENTION

Technical Problem

In the related art, an information processing apparatus controls a power supply to an IC module on the basis of detection information of electric waves transmitted from an external apparatus. However, a power source control method in the related art has the following problems.

In the information processing apparatus, when an electric wave over a predetermined level is incidentally detected due to noise mixing or amplitude variation in a state before staring communication with an external apparatus, there is a case where an excessive power source may be supplied. The same applies to a case where an electric wave turned on/off at predetermined intervals to save the power consumption of the external apparatus is detected.

Also, at the time of using detection information to terminate communication with an external apparatus, in a case where an information processing apparatus is held over an external apparatus which uses the same kind of electric wave and which is different from the external apparatus with which the information processing apparatus should originally communicate, there is a case where the information processing apparatus detects an electric wave transmitted from the different external apparatus and a power supply is erroneously continued. Also, regarding the setting in which a power supply is continued over a necessary certain period in an external apparatus with which it should originally communicate, since it is necessary to adopt the maximum setting that can support data retransmission and the change in a processing period, there is a case where a power supply is excessively continued.

Also, when it detects a polling request electric wave transmitted from an external apparatus to detect other communication parties in a state after terminating communication, there is a case where an excessive power source is supplied.

Therefore, the present invention is directed to provide an information processing apparatus, power source control method of the information processing apparatus and program that can efficiently supply a driving power source to an IC module.

Solution to Problem

According to an embodiment of the present disclosure, there is provided an information processing apparatus including an IC module that performs communication with an external apparatus, a detection unit that detects an electric wave, a timer that measures a time course after being started, a power supply unit that supplies a power source to the IC module, and a control unit that controls a supply amount of the power source based on a detection result of the electric wave and a determination result of a value of the timer. The control unit starts the timer after terminating communication with the external apparatus, restarts the timer every time a transmission start of an electric wave is detected, in response to detection of an electric wave received from an outside at a predetermined interval in the detection unit, and, when the transmission start of the electric wave is not detected and the timer finds a lapse of a first period longer than the predetermined interval, resets a power supply to the IC module in a manner that the information processing apparatus shifts to a communication standby state before a start of communication.

Before starting communication with the external apparatus, the control unit may cause the timer to measure a period until detection of a transmission end after detection of the transmission start of the electric wave, and, when the timer finds a lapse of a second period equivalent to a transmission period of an electric wave corresponding to a polling request, may control a power supply amount to the IC module to start the communication with the external apparatus.

Before starting communication with the external apparatus, the control unit may cause the timer to measure a period until detection of a transmission start after detection of a transmission end of an electric wave, and, when the timer finds a lapse of a third period equivalent to a non-transmission period of an electric wave between so polling requests that are intermittently transmitted, may control a power supply amount to the IC module to the start the communication with the external apparatus.

The control unit may start the timer at a time of a start of the communication with the external apparatus, may restart the timer every time the IC module receives an appropriate communication packet from the external apparatus, and, when the appropriate communication data is not received and the timer finds a lapse of a fourth period longer than a reception period defined by an application being executed in the control unit, may control a power supply amount to the IC module to terminate the communication with the external apparatus.

According to another embodiment of the present disclosure, there is provided a power source control method of an information processing apparatus, including starting a timer when communication with an external apparatus through an IC module is terminated, restarting the timer every time a transmission start of an electric wave is detected in response to a polling request transmitted from the external apparatus at a predetermined interval, and resetting a power supply to the IC module in order to shift to a communication standby state before a start of communication when the transmission start of the electric wave is not detected and the timer finds a lapse of a first period longer than the predetermined interval.

According to another aspect of the present invention, a program to cause a computer to execute the above power source control method of the information processing apparatus is provided. Here, the program may be provided using a computer-readable recording medium or may be provided through a communication unit, and so on.

Advantageous Effects of Invention

According to the present invention, it is possible to provide an information processing apparatus, power source control method of the information processing apparatus and program that can efficiently supply a driving power source to an IC module.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

[1. Outline of Power Source Control Method]

Figure 1:
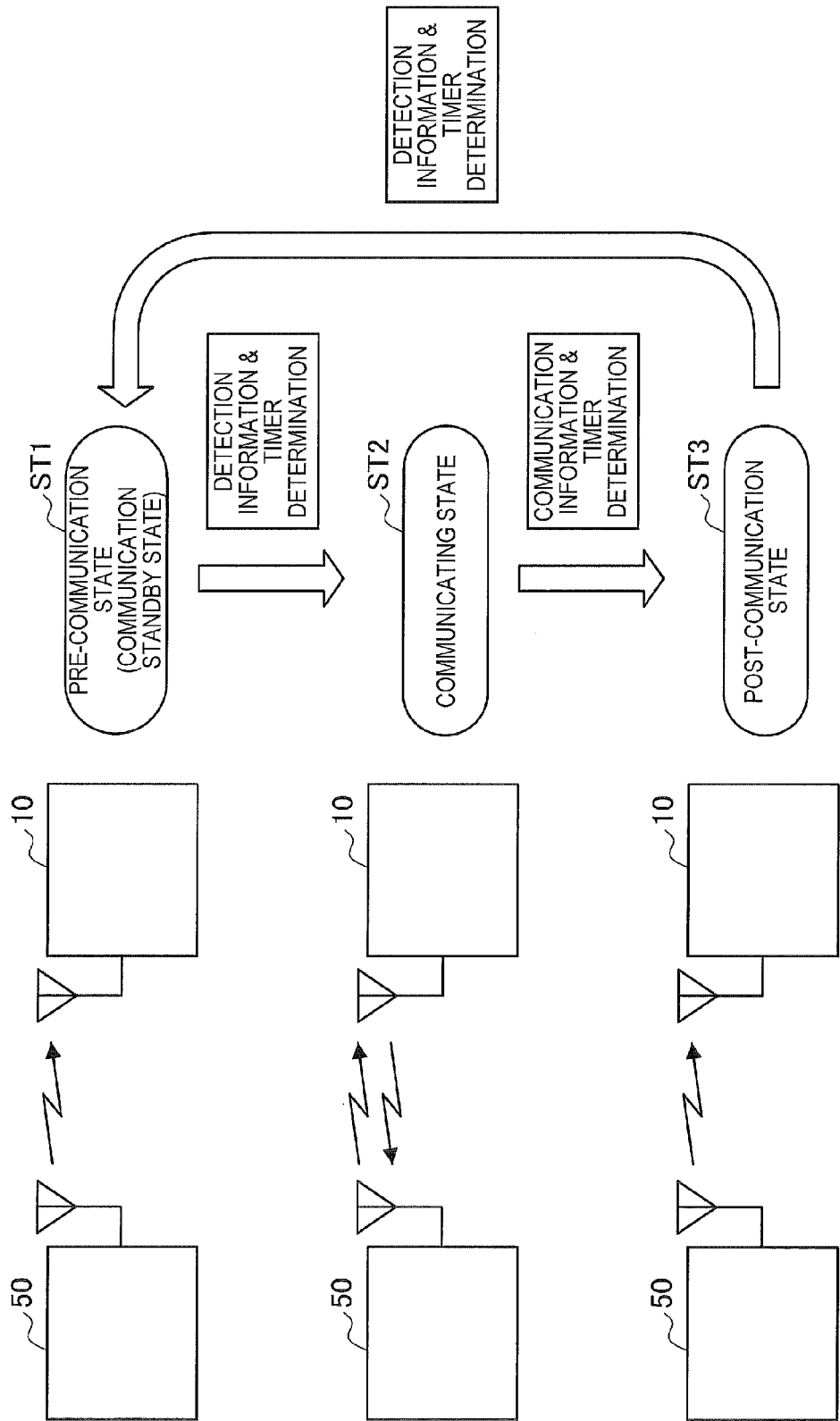
FIG. 1 is a diagram illustrating an outline of a power source control method of an information processing apparatus according to an embodiment of the present invention.

First, with reference to FIG. 1, the outline of a power source control method of an information processing apparatus according to an embodiment of the present invention is described. As illustrated in FIG. 1, an IC module 10 mounted on an information processing apparatus that is not illustrated in the drawing performs near field communication with an external apparatus 50 such as a reader and a writer.

In the IC module 10, when a result of timer determination based on detection information satisfies a predetermined condition in a standby state of communication start (pre-communication state ST1), a power supply is controlled to start communication (the power supply amount is increased). The predetermined condition of pre-communication state ST1 is satisfied when a period between the transmission start of an electric wave and the transmission end substantially matches a transmission period (second period) of an electric wave at the time of a polling request or when a period between the transmission end of the electric wave and the transmission start substantially matches a non-transmission period (third period) of electric waves between polling requests. By this means, even if an electric wave is detected due to mixing of noise or the like in pre-communication state ST1, the power supply amount is not increased to start communication as long as the predetermined condition is not satisfied. Also, the same applies to a case where an electric wave which is intermittently transmitted is detected. Therefore, by suppressing unnecessary power supply in pre-communication state ST1, it is possible to efficiently supply a driving power source to the IC module 10.

Also, when a result of timer determination based on communication information satisfies a predetermined condition in a communication start state (communicating state ST2), power supply is controlled to terminate communication (the power supply amount is decreased). The predetermined condition of communicating state ST2 is satisfied when a normal communication packet is not received from the external apparatus 50 in a predetermined period (the fourth period) longer than a reception period defined for each application being executed in an information processing apparatus. By this means, even if electric waves from other external apparatuses are detected in communicating state ST2, when the predetermined condition is not satisfied, power supply is not erroneously continued. Also, if a normal communication packet is not received in the predetermined period, since power supply is controlled to terminate communication (the power supply amount is decreased), the power supply does not have to be continued over a certain period of time. Therefore, by suppressing unnecessary power supply in communicating state ST2, it is possible to efficiently supply a driving power source to the IC module 10.

Also, when a result of timer determination based on detection information satisfies a predetermined condition in a communication end state (post-communication state ST3), it shift to pre-communication state ST1 to reset power supply for communication start standby. The predetermined condition of post-communication state ST3 is satisfied when the electric wave transmission start is not detected in a predetermined interval (the first period) longer than a transmission interval of a polling request. By this means, even if the polling request electric wave directed to other communication parties is detected in post-communication state ST3, when the predetermined condition is not satisfied, the power supply amount is not increased to start communication. Therefore, by suppressing unnecessary power supply in post-communication state ST3, it is possible to efficiently supply a driving power source to the IC module 10.

[2. Configuration of Information Processing Apparatus System]

Figure 2:
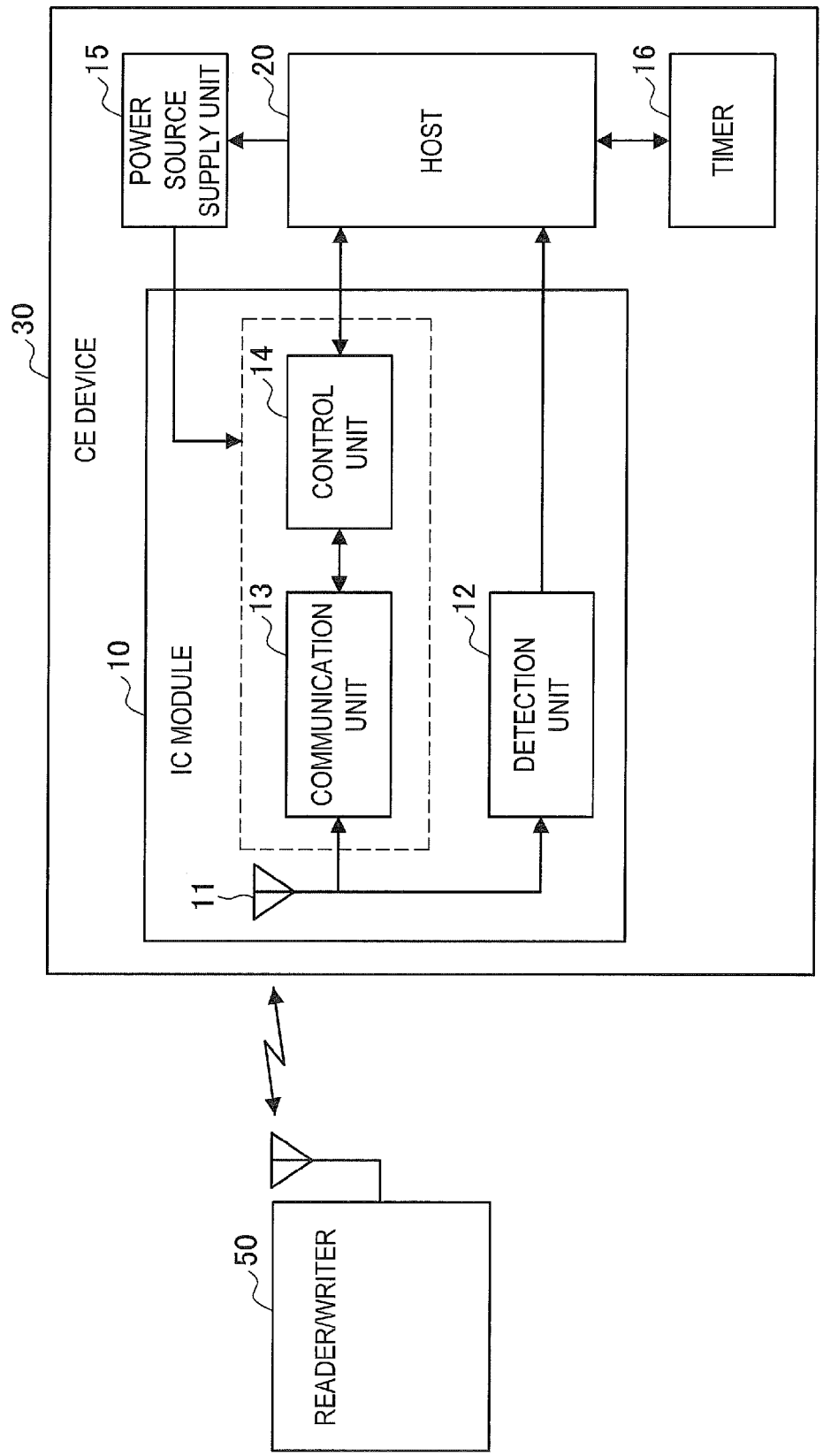
FIG. 2 is a diagram illustrating a configuration of an information processing system according to an embodiment of the present invention.

Next, a system configuration of an information processing apparatus 30 according to an embodiment of the present invention is described referring to FIG. 2. As illustrated in FIG. 2, near field communication is performed between the information processing apparatus 30 and the external apparatus 50 in the information processing system. The near field communication may be performed between communication apparatuses separated by about several tens of centimeters by using a carrier wave of the single frequency of 13 MHz, for example, and may be performed between communication apparatuses that mutually contact with each other.

The information processing apparatus 30 is, for example, a personal computer, a PDA, a mobile phone or a consumer electronic device (CE device). The external apparatus 50 is a reader/writer connected to a controller that is not illustrated in the drawing. Here, the reader/writer and the controller may be integrally configured or may be separately configured. In the following, an explanation is given to a case where the information processing apparatus 30 is a CE device and the external apparatus 50 is a reader/writer.

The CE device 30 includes the IC module 10, a power source supply unit 15, a timer 16 and a host 20 (control unit). Here, the IC module 10 may be incorporated in the CE device 30 or may be detachably attached to the CE device 30. The IC module 10 may include an antenna coil 11, a detection unit 12, a communication unit 13 and a control unit 14.

The antenna coil 11 supplies a signal received from the outside to the detection unit 12 and the communication unit 13, and transmits a signal supplied from the communication unit 13 to the outside. The detection unit 12 includes a low-pass filter, a matching circuit and a detection diode, and so on, and detects a signal supplied from the antenna coil 11. The detection unit 12 supplies a detection signal indicating transmission/non-transmission of an electric wave having a predetermined frequency and level to the host 20. The detection signal is supplied as, for example, a Low signal lasted over an electric wave transmission period and a High signal lasted over an electric wave non-transmission period. In this case, the change from the High signal to the Low signal corresponds to a transmission start signal of the electric wave and the change from the Low signal to the High signal corresponds to the transmission end signal of the electric wave.

The communication unit 13 includes a demodulation circuit and a load modulation circuit, and so on, and performs transmission and reception processing for near field communication. The communication unit 13 supplies communication information included in a received signal to the control unit 14 and supplies the communication information supplied from the control unit 14 to the antenna coil 11 as a transmission signal. The communication information is a polling request, writing request, written data and reading request received from a reader/writer 50, and is a polling response, writing response, reading response and read data transmitted to the reader/writer 50.

The control unit 14 includes a memory to store data or the like and controls transmission and reception processing by the communication unit 13. The control unit 14 transfers control information and data, and so on, with the host 20 through an interface that is not illustrated in the drawing. The control unit 14 determines whether the communication information from the reader/writer 50 is a normal communication packet assumed by an application being executed by the host 20, and supplies a determination signal indicating the determination result to the host 20. Here, the communication packet determination may be performed on the side of the 20 host.

The power source supply unit 15 supplies a power source to the IC module 10, the timer 16 and the host 20. The power source supply unit 15 controls power supply with respect to the IC module 10 according to control by the host 20. Here, although a power source is supplied to the communication unit 13 and the control unit 14, it is not necessary to be supplied to the detection unit 12 driven by electromagnetic induction of the antenna coil 11. Also, in the drawing, a power supply line to the timer 16 and the host 20 is omitted. The timer 16 is started (or restarted) according to the control by the host 20 and measures the elapsed time after the start (or restart). Here, the time 16 may be set every predetermined condition in order to measure the predetermined condition of each communication state.

The host 20 (a control unit of the CE device 30) includes a CPU, a ROM, and a RAM, and so on, and performs computation and control required for an operation of the CE device 30. By reading a program stored in the ROM or the like, developing it in the RAM or the like and executing it, the host 20 performs a power source control method according to an embodiment of the present invention. The host 20 controls the timer 16 according to a detection signal from the detection unit 12 and/or a determination signal of communication information. When the host 20 determines the timer value and the predetermined condition set for each communication state is satisfied, it controls power supply from the power source supply unit 15 to the IC module 10. Here, the predetermined condition for each communication state is read from the ROM or the like.

[3. Power Source Control Method]

Figure 3:
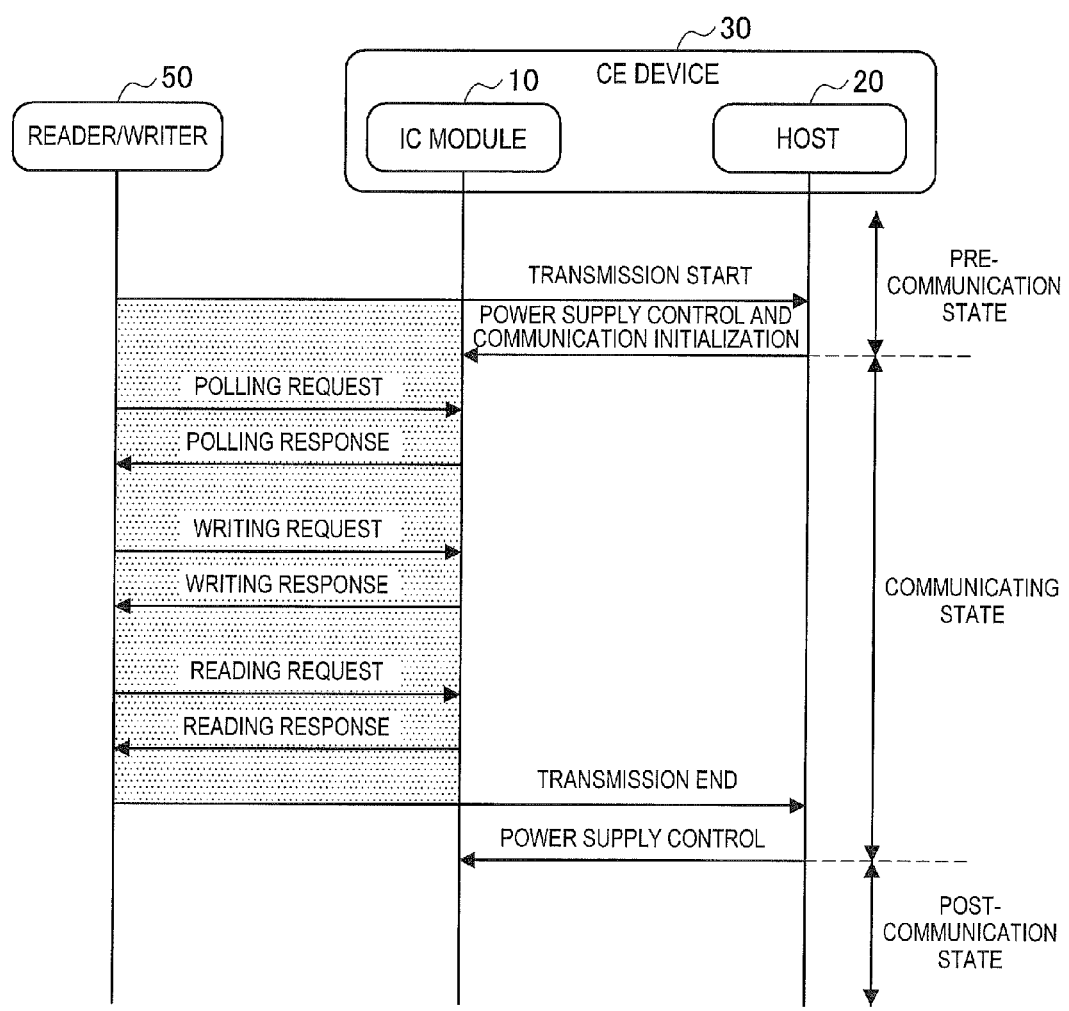
FIG. 3 is a flowchart illustrating a power source control method based on detection information.
Figure 4:
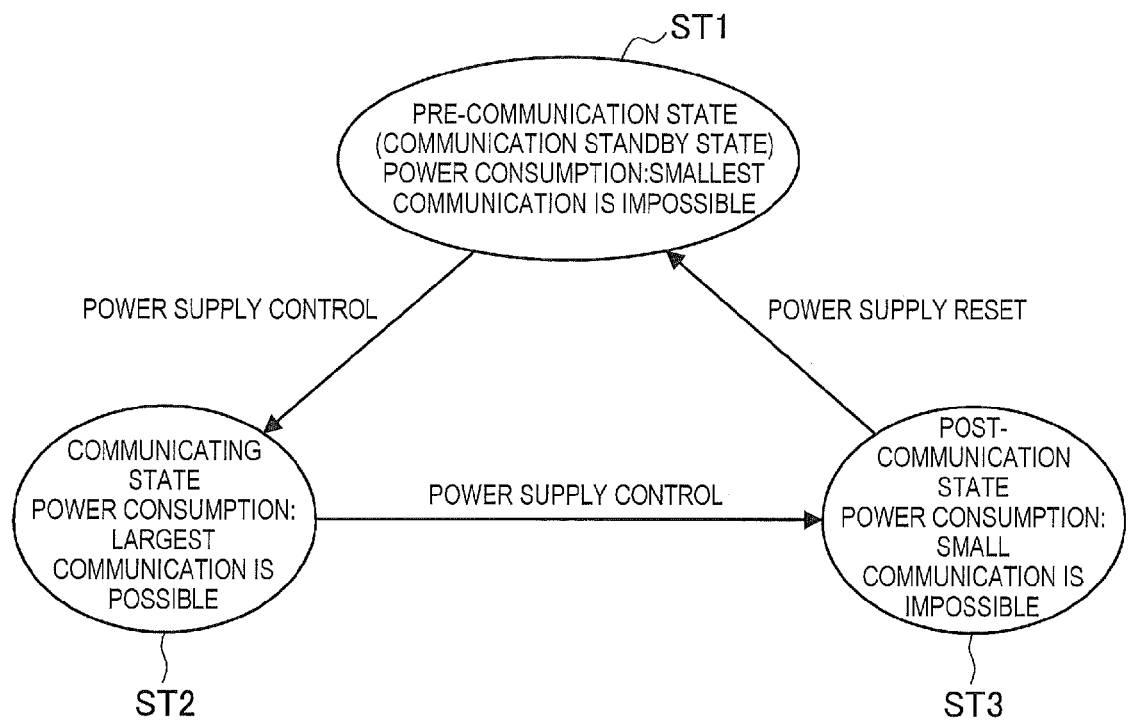
FIG. 4 is a diagram illustrating the state transition of a CE device.
Figure 9:
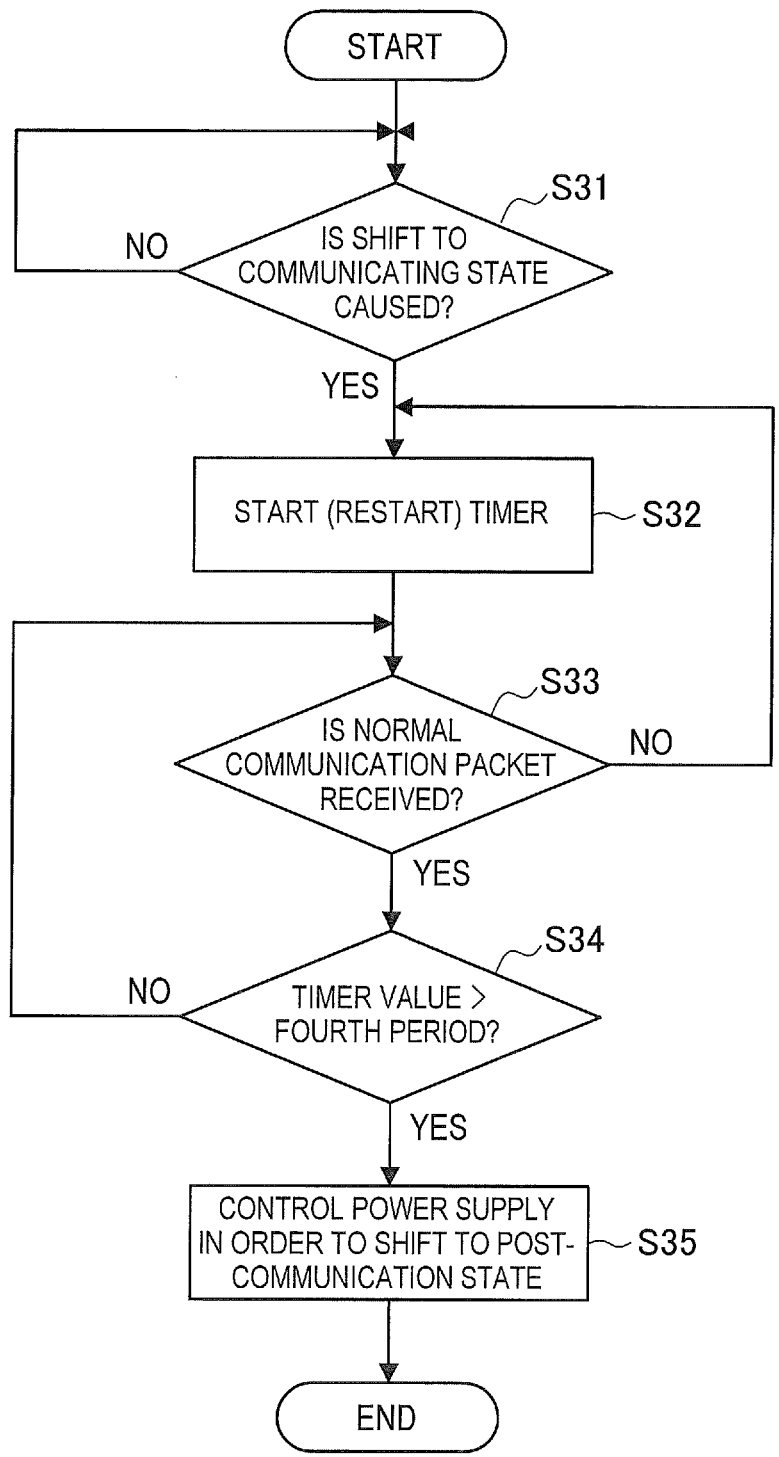
FIG. 9 is a flowchart indicating a power source control method in a communication state.
Figure 10:
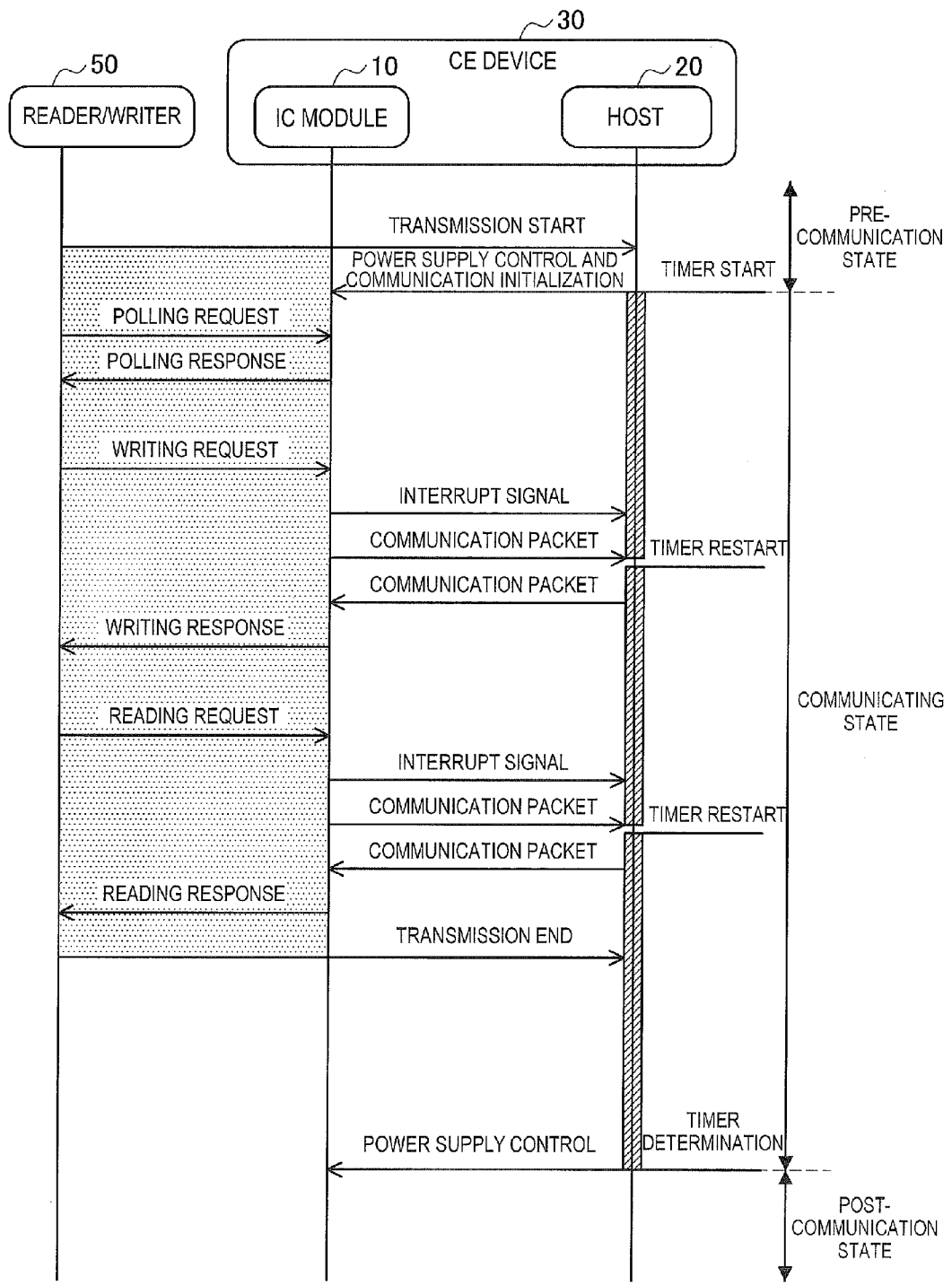
FIG. 10 is a sequence diagram indicating a power source control method in a communication state.
Figure 11:
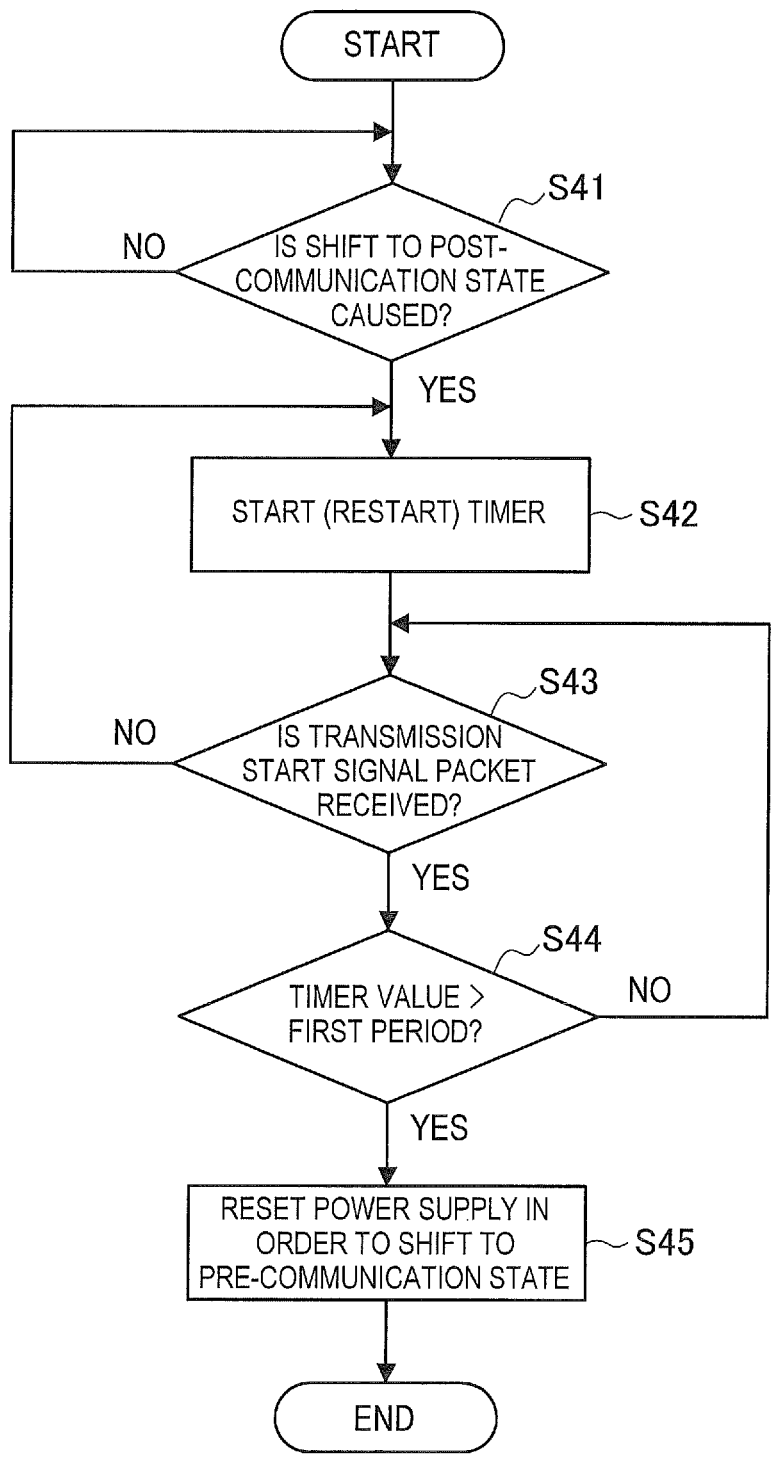
FIG. 11 is a flowchart indicating a power source control method in a post-communication state.
Figure 12:
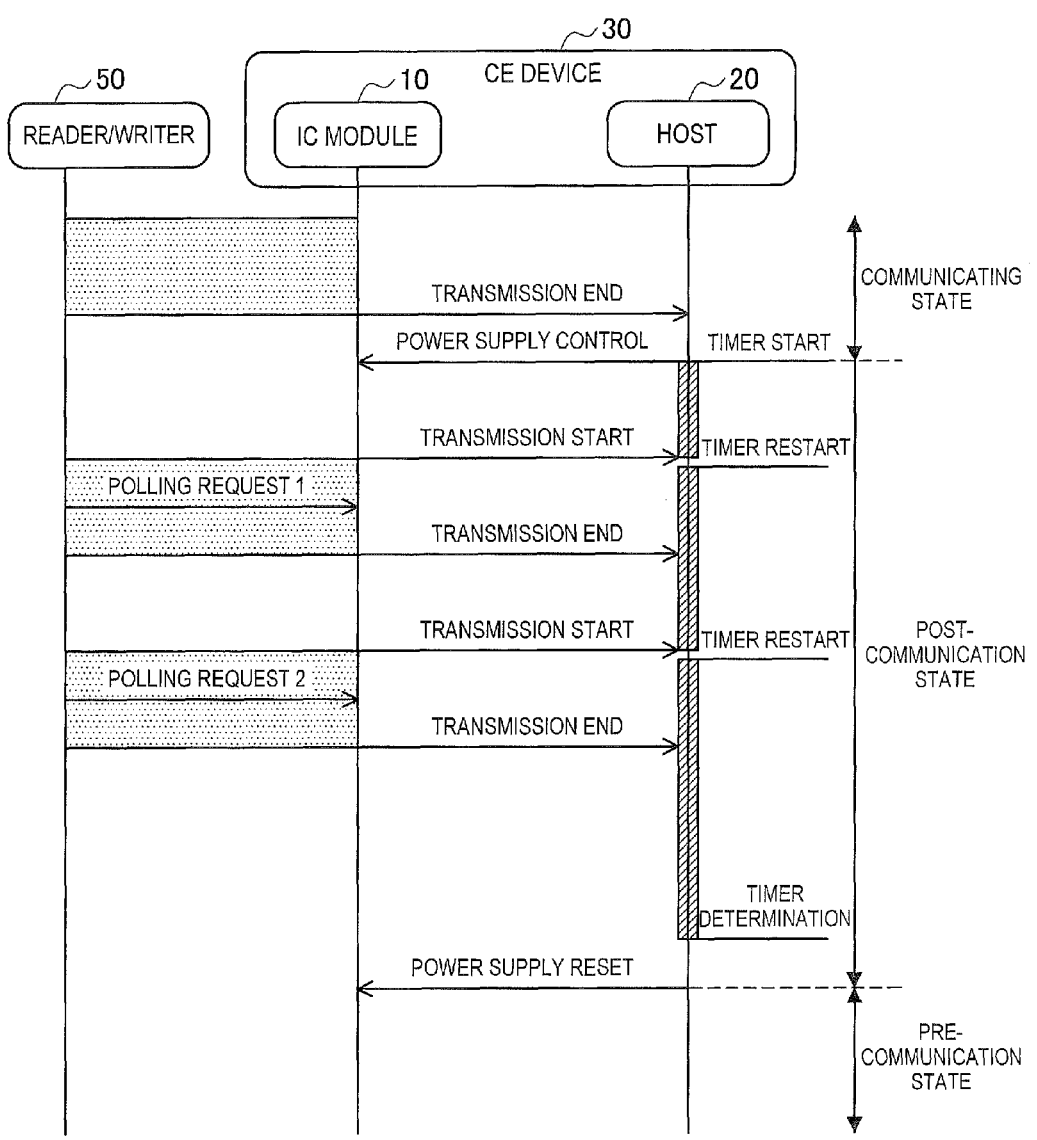
FIG. 12 is a sequence diagram indicating a power source control method in a post-communication state.

Next, a power source control method of the CE device 30 according to an embodiment of the present invention is described with reference to FIG. 3 to FIG. 12. FIG. 3 is a flowchart indicating a power source control method based on detection information. FIG. 4 is a diagram indicating the state transition of the CE device 30. FIG. 5 to FIG. 8 are flowcharts and sequence diagrams indicating the power source control method in pre-communication state ST1. FIG. 9 and FIG. 10 are a flowchart and sequence diagram indicating the power source control method in communicating state ST2. FIG. 11 and FIG. 12 are a flowchart and sequence diagram indicating the power source control method in post-communication state ST3. Here, the dot hatching in the sequence diagrams indicates an electric wave transmission period.

As illustrated in FIG. 3, the reader/writer 50 transmits a predetermined electric wave (a magnetic field is generated) to transmit a polling request. When so detecting the predetermined electric wave in pre-communication state ST1 (communication standby state), the IC module 10 supplies a transmission start signal to the host 20. When receiving the transmission start signal, the host 20 controls power supply with respect to the IC module 10 in order to shift to communicating state ST2 (the power supply amount is increased), and initializes communication.

In communicating state ST2, the IC module 10 receives the polling request from the reader/writer 50, transmits a polling response to the reader/writer 50 and thereby establishes communication connection with the reader/writer 50. When the communication connection is established, the IC module 10 performs writing processing in cooperation with the host 20 according a writing request from the reader/writer 50 and transmits a writing response to the reader/writer 50. Further, the IC module 10 performs reading processing in cooperation with the host 20 according to a reading request from the reader/writer 50 and transmits a reading response to the reader/writer 50.

The reader/writer 50 terminates electric wave transmission to terminate communication. When the predetermined electric wave is not detected in communicating state ST2, the IC module 10 supplies a transmission end signal to the host 20. When receiving the transmission end signal, the host 20 controls power supply with respect to the IC module 10 (the power supply amount is decreased) in order to shift to post-communication state ST3. In post-communication state ST3, if the predetermined electric wave is not detected over a predetermined period, the host 20 resets the power supply with respect to the IC module 10 (the power supply amount is further decreased) in order to shift to pre-communication state ST1 (communication standby state).

As illustrated in FIG. 4, in pre-communication state ST1 (communication standby state), the CE device 30 is in a state where detection is possible and communication is impossible, and has the smallest power consumption than in the other states. In communicating state ST2, the CE device 30 is in a state where so detection is possible and communication is possible, and has the largest power consumption than in the other states. In post-communication state ST3, the CE device 30 is in a state where detection is possible, power source reset processing is possible and communication is impossible, and has smaller power consumption.

In the power source control method, in pre-communication state ST1 (communication standby state), when a result of timer determination based on detection information satisfies a predetermined condition, power supply with respect to the IC module 10 is controlled (the power supply amount is increased) in order to shift to communicating state ST2. In communicating state ST2, when a result of timer determination based on communication information satisfies a predetermined condition, power supply with respect to the IC module 10 is controlled (the power supply amount is decreased) in order to shift to post-communication state ST3. In post-communication state ST3, when a result of timer determination based on detection information satisfies a predetermined condition, power supply with respect to the IC module 10 is reset (the power supply amount is further decreased) in order to shift to pre-communication state ST1 (communication standby state).

[3-1. Power Source Control in Pre-Communication State ST1 (Communication Standby State)]

First, with reference to FIG. 5 to FIG. 8, the power source control method in pre-communication state ST1 is described. Here, in pre-communication state ST1, either of the first power source control based on the electric wave transmission period illustrated in FIG. 5 and FIG. 6 or the second power source control based on the electric wave non-transmission period illustrated in FIG. 7 and FIG. 8 may be performed, or both of them may be performed in combination.

Figure 5:
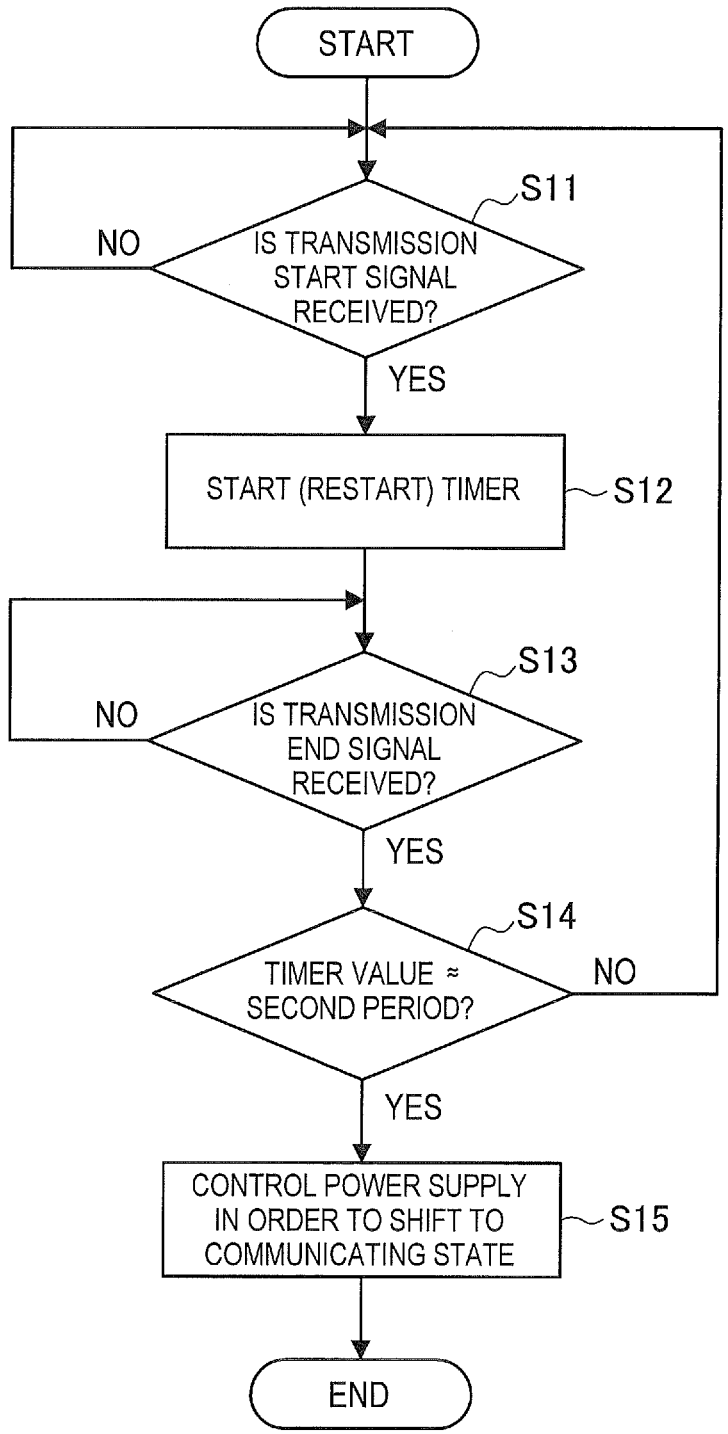
FIG. 5 is a flowchart indicating the first power source control method in a pre-communication state.
Figure 6:
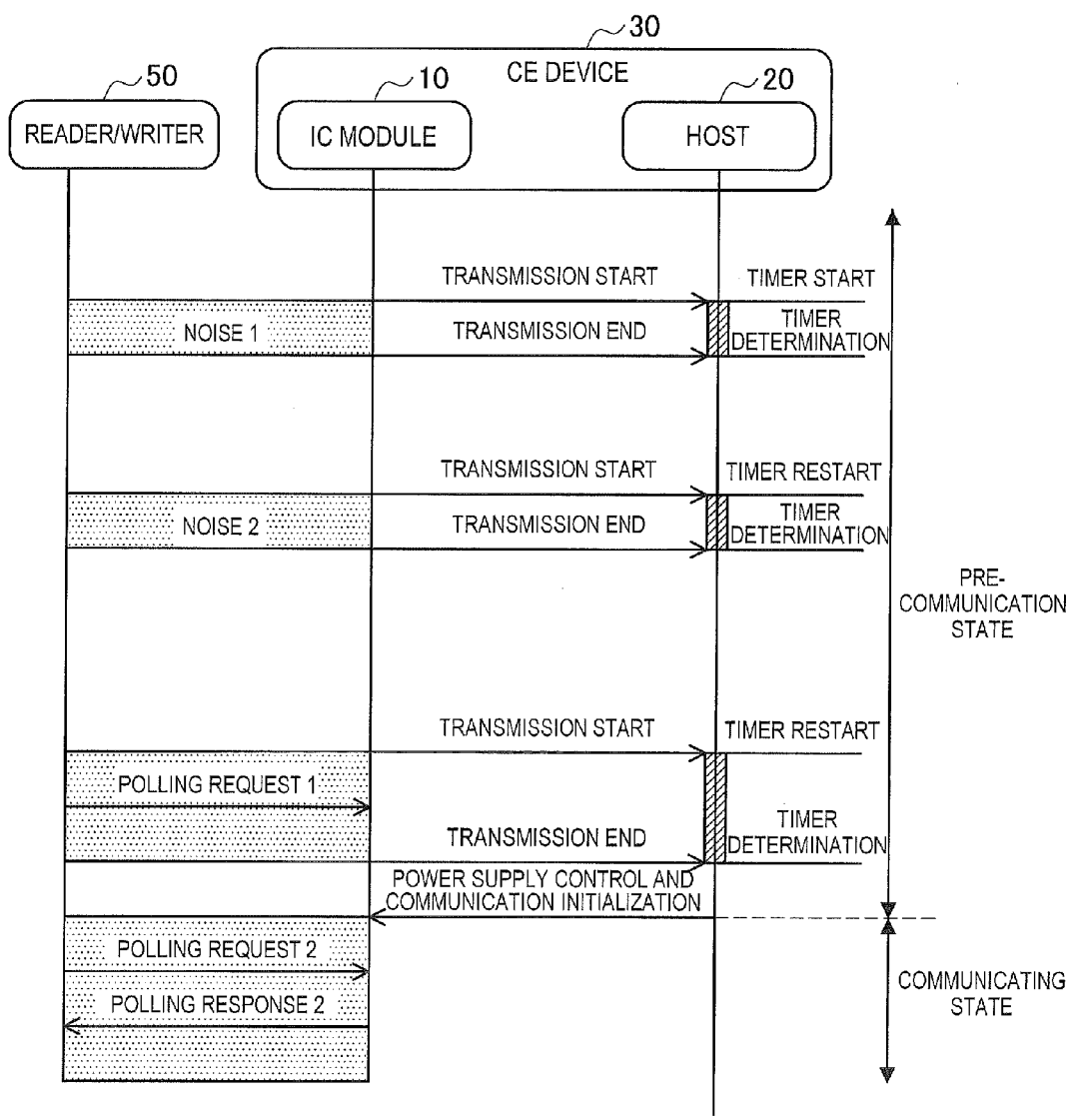
FIG. 6 is a sequence diagram indicating the first power source control method in a pre-communication state.

First, with reference to FIG. 5 and FIG. 6, the first power source control in pre-communication state ST1 is described. When being in pre-communication state ST1, the host 20 performs the power source control in pre-communication state ST1. As illustrated in FIG. 5, the host 20 determines whether a transmission start signal is received from the IC module 10 (step S11), and, when receiving the transmission start signal, performs the following processing. After starting the timer 16 according to the transmission start signal (step S12), the host 20 determines whether a transmission end signal is received from the IC module 10 (step S13). When receiving the transmission end signal, the host 20 determines whether the timer value at the time of receiving the transmission end signal satisfies a predetermined condition (step S14).

The host 20 determines whether the timer value, that is, a period from the electric wave transmission start to the electric wave transmission end corresponds to a transmission period (second period) of an electric wave at the time of a polling request. Here, the electric wave transmission period (second period) at the time of the polling request denotes a period in which the polling request is transmitted after the reader/writer 50 starts electric wave transmission, reception of a polling response from the IC module 10 is waited over a predetermined period and the electric wave transmission is terminated. This transmission period is set in advance by a communication protocol.

Subsequently, in a case where the timer value satisfies the predetermined condition, the host 20 controls power supply with respect to the IC module 10 (the power supply amount is increased) in order to shift to communicating state ST2 (step S15). In the IC module 10, in response to the power supply, a communication function can be executed. By contrast, in a case where the timer value do not satisfy the predetermined condition, the host 20 returns to the processing in step S11 and determines whether a transmission start signal is received.

As illustrated in FIG. 6, in a case where the IC module 10 is in pre-communication state ST1, the host 20 performs the power source control method illustrated in FIG. 5. By the way, in pre-communication state ST1, there is a case where the IC module 10 incidentally detects a predetermined electric wave due to noise mixing or amplitude variation. Also, there is a case where the IC module 10 detects a predetermined electric wave which is intermittently transmitted at predetermined intervals to save the power consumption of the reader/writer 50.

The IC module 10 detects the predetermined electric wave due to the noise mixing or intermittent transmission. In FIG. 6, electric waves detected due to mixing of noises 1 and 2 are assumed. In this case, the IC module 10 supplies a transmission start signal to the host 20 and the host 20 starts (or resets the timer value and restarts) the timer 16 according to the transmission start signal. When the predetermined electric wave is not detected, the IC module 10 supplies a transmission end signal to the host 20 and the host 20 determines the timer value according to the transmission end signal.

Here, there is a very low possibility that time over which electric waves due to noise mixing last substantially matches the transmission period of an electric wave at the time of a polling request (second period). Therefore, even if the predetermined electric wave is detected due to the noise mixing and the like, the host 20 determines that the timer value does not satisfy the predetermined condition. Therefore, power supply with respect to the IC module 10 is not controlled (the power supply amount is increased) in order to shift to communicating state ST2.

Meanwhile, the IC module 10 detects a predetermined electric wave at the time of a polling request. In FIG. 6, the electric wave detected at the time of transmitting polling request 1 is assumed. Even in this case, the IC module 10 supplies a transmission start signal to the host 20 and the host 20 starts (or resets the timer value and restarts) the timer 16 according to the transmission start signal. When the predetermined electric wave is not detected, the IC module 10 supplies a transmission end signal to the host 20 and the host 20 determines the timer value according to the transmission end signal.

Here, the electric wave at the time of the polling request is transmitted over the transmission period (second period) set by the communication protocol. Therefore, when the predetermined electric wave is detected at the time of polling request 1, the host 20 determines that the timer value satisfies the predetermined condition. Therefore, power supply with respect to the IC module 10 is controlled (the power supply amount is increased) in order to shift to communicating state ST2.

Subsequently, in communicating state ST2, the IC module 10 receives polling request 2 from the reader/writer 50, transmits polling response 2 to the reader/writer 50 and thereby establishes communication connection with the reader/writer 50. Here, before shifting to communicating state ST2, since the IC module 10 is in a state where detection is possible and communication is impossible, it is not possible to receive the polling request and establish the communication connection with the reader/writer 50.

Figure 7:
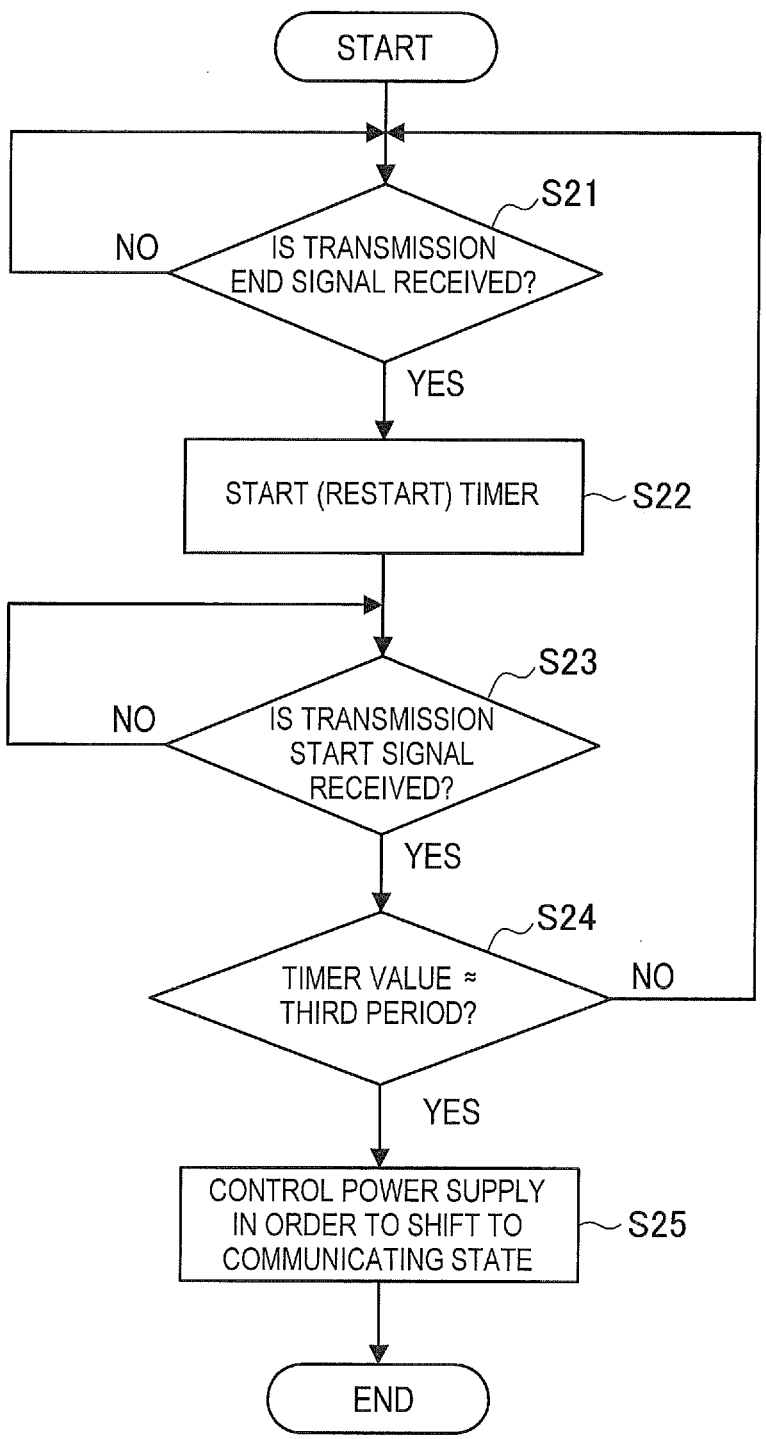
FIG. 7 is a flowchart indicating the second power source control method in a pre-communication state.
Figure 8:
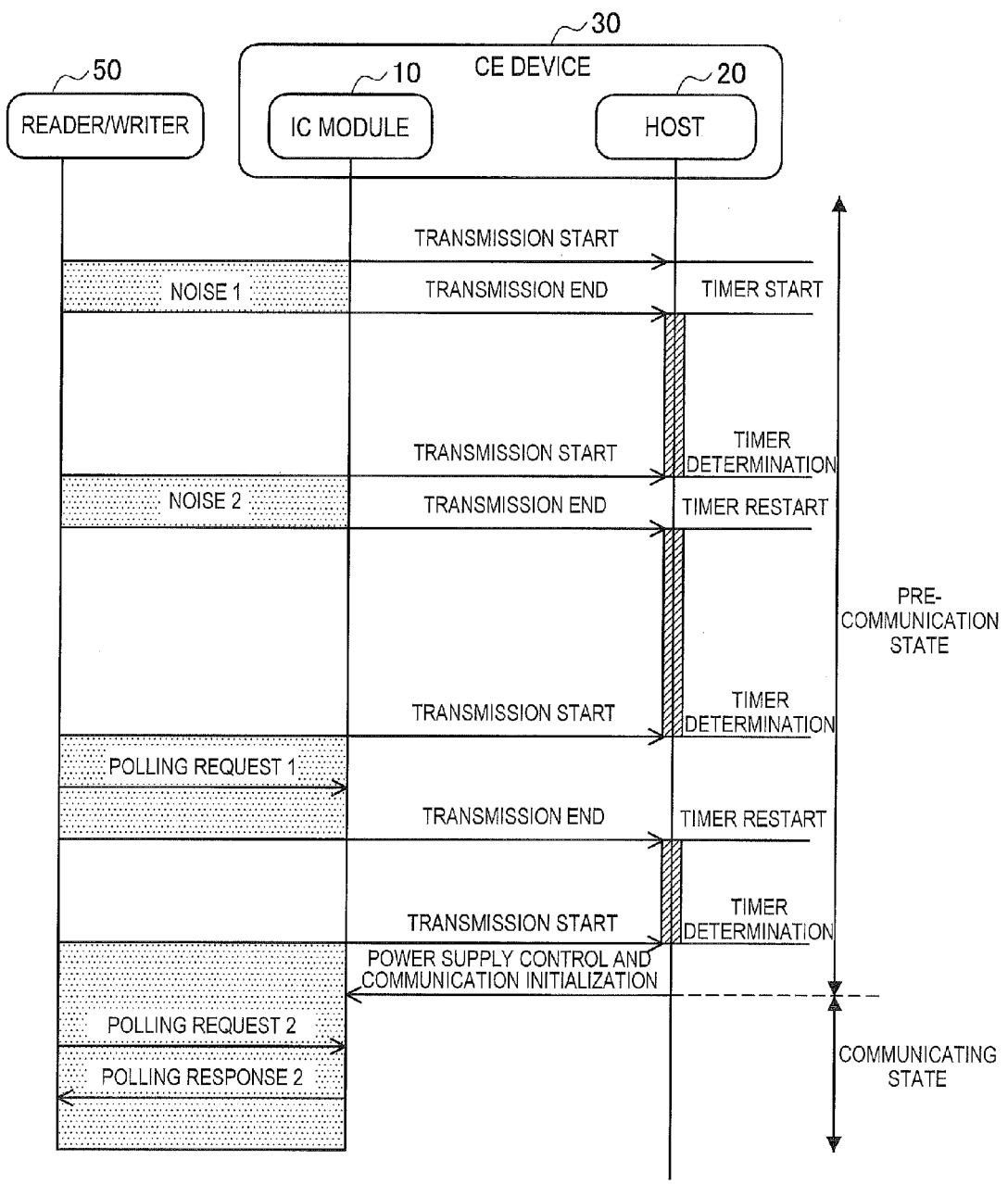
FIG. 8 is a sequence diagram indicating the second power source control method in a pre-communication state.

Next, with reference to FIG. 7 and FIG. 8, the second power source control in pre-communication state ST1 is described. Also, in the following explanation, an explanation overlapping with FIG. 5 and FIG. 6 is omitted.

As illustrated in FIG. 7, the host 20 determines whether the transmission end signal is received from the IC module 10 (step S21), and, when receiving the transmission end signal, performs the following processing. After starting the timer 16 according to the transmission start signal (step S22), the host 20 determines whether a transmission start signal is received from the IC module 10 (step S23). When receiving the transmission start signal, the host 20 determines whether the timer value at the time of receiving the transmission start signal satisfies a predetermined condition (step S24).

The host 20 determines whether the timer value, that is, a period from the electric wave transmission end to the electric wave transmission start corresponds to a non-transmission period (third period) of electric waves between polling requests in a case where a polling request is intermittently repeated. Also, the non-transmission period (third period) of electric waves between polling requests denotes so a period until transmission of the next polling request electric wave is started after the reader/writer 50 starts transmission of the electric wave at the time of the polling request. This non-transmission period is set in advance by the communication protocol.

Subsequently, in a case where the timer value satisfies the predetermined condition, the host 20 controls power supply with respect to the IC module 10 (the power supply amount is increased) in order to shift to communicating state ST2 (step S25). In the IC module 10, in response to the power supply, a communication function can be executed. By contrast, in a case where the timer value do not satisfy the predetermined condition, the host 20 returns to the processing in step S21 and determines whether a transmission end signal is received.

As illustrated in FIG. 8, in a case where the IC module 10 is in pre-communication state ST1, the host 20 performs the power source control method illustrated in FIG. 7. The IC module 10 detects a predetermined electric wave due to noise mixing or intermittent transmission. In FIG. 8, electric waves detected due to mixing of noises 1 and 2 are assumed. In this case, the IC module 10 supplies a transmission end signal to the host 20 when the predetermined electric wave is not detected, and starts (or resets the timer value and restarts) the timer 16 according to the transmission end signal. When the predetermined electric wave is detected again, the IC module 10 supplies a transmission start signal to the host 20 and the host 20 determines the timer value according to the transmission start signal.

Here, there is a very low possibility that the occurrence interval of electronic waves due to noise mixing or the like substantially matches the non-transmission period (third period) of electric waves between polling requests. Therefore, even if a predetermined electronic wave is detected due to the noise mixing or the like, the host 20 determines that the timer value does not satisfy the predetermined condition. Therefore, power supply with respect to the IC module 10 is not controlled (the power supply amount is increased) in order to shift to communicating state ST2.

Meanwhile, the IC module 10 detects a predetermined electric wave at the time of a polling request. In FIG. 8, the electric wave detected at the time of transmitting polling request 1 is assumed. Even in this case, the IC module 10 supplies a transmission end signal to the host 20 when the predetermined electronic wave is not detected, and the host 20 starts (or resets the timer value and restarts) the timer 16 according to the transmission end signal. When the predetermined electric wave is detected, the IC module 10 supplies a transmission start signal to the host 20 and the host 20 determines the timer value according to the transmission start signal.

Here, an intermittent polling request electric wave is transmitted after the lapse of a predetermined non-transmission period (third period) set by the communication protocol. Therefore, when detecting a predetermined electric wave of polling request 2 transmitted after the lapse of the predetermined non-transmission period alter the end of transmission of electric waves at the time of polling request 1, the host 20 determines that the timer value satisfies the predetermined condition. Therefore, power supply with respect to the IC module 10 is controlled (the power supply amount is increased) in order to shift to communicating state ST2.

Subsequently, in communicating state ST2, the IC module 10 receives polling request 2 from the reader/writer 50, transmits polling response 2 to the reader/writer 50 and thereby establishes communication connection with the reader/writer 50. Here, before shifting to communicating state ST2, since the IC module 10 is in a state where detection is possible and communication is impossible, it is not possible to receive the polling request and establish the communication connection with the reader/writer 50.

[3-2. Power Source Control in Communicating State ST2]

Next, with reference to FIG. 9 and FIG. 10, the power source control method in communicating state ST2 is described. When being in communicating state ST2, the host 20 performs the power source control in communicating state ST2. As so illustrated in FIG. 9, the host 20 determines whether it shifts from pre-communication state ST1 to communicating state ST2 (or whether communication is initialized) (step S31), and, when the state shift is caused, the host 20 performs the following processing. After starting the timer 16 according to the state shift (step S32), the host 20 determines whether a normal communication packet is not received from the IC module 10 (step S33). The host 20 returns to step S32 when receiving the normal communication packet, resets the timer value and restarts the timer 16. The host 20 continuously determines whether the timer value satisfies the predetermined condition, until receiving the normal communication packet.

Here, the communication packet is communication information including a command or data transmitted from the reader/writer 50 to the IC module 10 at the time of a communication request such as a writing request and a reading request. A normal communication packet is a communication packet assumed by an application being executed in the host 20.

The host 20 determines whether the timer value, that is, a period between the shift to communicating state ST2 and the first reception of a normal communication packet or a period between reception of the normal communication packet and the reception of the next normal communication packet exceeds a predetermined period (the fourth period). The predetermined period (the fourth period) denotes a period longer than a reception period between the shift to communicating state ST2 and the reception of a normal communication packet of the first communication request or a reception period between the reception of a normal communication packet of a communication request and the reception of a normal communication request of the next communication request. This predetermined period is set for each application being executed in the CE device 30, and shared between the CE device 30 and reader/writer 50.

Subsequently, in a case where the timer value satisfies the predetermined condition, the host 20 controls power supply with respect to the IC module 10 (the power supply amount is decreased) in order to shift to post-communication state ST3 (step S35). In the IC module 10, when it shifts to post-communication state ST3, a communication function cannot be executed. By contrast, in a case where the timer value does not satisfy the predetermined condition, the host 20 returns to the processing in step S33 and determines whether a normal communication packet is not received.

As illustrated in FIG. 10, in a case where the IC module 10 is in communicating state ST2, the host 20 performs the power source control method illustrated in FIG. 9. By the way, in communicating state ST2, the IC module 10 has to continuously receive power supply over a period assumed in data communication. However, before communication with the reader/writer 50 is terminated, when an electric wave from a different reader/writer 50 that is executing a different application is detected, there is a case where power supply may be erroneously continued though it is not possible to establish communication connection. Also, in the setting to continue power supply for a certain period, when the setting supporting data retransmission or the change in a processing period is adopted, there is a case where power supply is excessively continued.

In pre-communication state ST1, when detecting an electric wave satisfying the predetermined condition described in the power source control method in pre-communication state ST1, the IC module 10 supplies a transmission start signal to the host 20, and the host 20 controls power supply with respect to the IC module 10 (the power supply amount is increased) in order to shift to communicating state ST2. When the shift to communicating state ST2 is caused, the host 20 starts the timer 16 according to the state shift. The host 20 continuously determines whether the timer value satisfies the predetermined condition, until receiving a normal communication packet from the communicating reader/writer 50.

When receiving a polling request from the reader/writer 50, the IC module 10 transmits a polling response to the reader/writer 50. When the IC module 10 receives a writing request from the reader/writer 50, after a communication packet following an interrupt signal is supplied to the host 20, a communication packet for transmission is supplied from the host 20 and a writing response is transmitted to reader/writer 50. Also, when the IC module 10 receives a reading request from the reader/writer 50, after a communication packet following an interrupt signal is supplied to the host 20, a communication packet for transmission is supplied from the host 20 and a reading response is transmitted to reader/writer 50. In communicating state ST2, when the IC module 10 does not detect a predetermined electric wave, a transmission end signal is supplied to the host 20.

Here, after shifting to communicating state ST2, the host 20 receives a normal communication packet in a predetermined period, and, after receiving the normal communication packet, receives the next normal communication packet within a predetermined period (the fourth period). In FIG. 10, communication packets at the writing time and reading time are received as normal communication packets. Subsequently, every time the normal communication packet is received, the timer value is reset and the timer 16 is restarted. Therefore, if the communication packet is received from the communicating reader/writer 50, the host determines that the timer value does not satisfy the predetermined condition. Therefore, in order to shift to post-communication state ST3, power supply with respect to the IC module 10 is not controlled (the power supply amount is decreased).

Meanwhile, when the host 20 does not receive a communication packet from the communicating reader/writer 50 or receives a communication packet from a different reader/writer 50, it is not possible to receive the normal communication packet within a predetermined period (the fourth period). FIG. 10 assumes a case where a communication packet cannot be acquired from the communicating reader/writer 50 in addition to a communication packet at the time of a reading request. Then, the host 20 cannot reset the timer value, a predetermined period (the fourth period) passes, and it determines that the timer value satisfies the predetermined condition. Here, even in a case where a communication packet is so received from a different reader/writer 50, since it is not a normal communication packet, the host 20 determines that the timer value satisfies a predetermined condition. Therefore, in order to shift to post-communication state ST3, power supply with respect to the IC module 10 is controlled (the power supply amount is decreased).

[3-3. Power Source Control in Post-Communication State ST3]

Next, with reference to FIG. 11 and FIG. 12, the power source control method in post-communication state ST3 is described. When the host 20 is in post-communication state ST3, it performs the power source control in post-communication state ST3. As illustrated in FIG. 11, the host 20 determines whether the shift from communicating state ST2 to post-communication state ST3 is caused (step S41), and, when the shift to post-communication state ST3 is caused, performs the following processing. After starting the timer 16 according to the state shift (step S42), the host 20 determines whether a transmission start signal is not received from the IC module 10 (step S43). When receiving the transmission start signal, the host 20 returns to step S42, resets the timer value and restarts the timer 16. The host 20 continuously determines whether the timer value satisfies the predetermined condition until receiving the transmission start signal (step S44).

The host 20 determines whether the timer value, that is, a period between the shift to post-communication state ST3 and the reception of the first electric wave or a period to receive electric waves that are intermittently transmitted exceeds a predetermined period (the first period). The predetermined period (the first period) denotes a period longer than a period between the shift to post-communication state ST3 and the start of electric wave transmission at the time of a polling request or a period longer than a period between the start of electric wave transmission at the time of a polling request and the start of an electric wave transmission at the time of the next polling request. Here, the electric wave transmission interval at the time of a polling request is set in advance by the communication protocol and the predetermined period is shared between the CE device 30 and the reader/writer 50.

Subsequently, in a case where the timer value satisfies a predetermined condition, in order to shift to pre-communication state ST1, the host 20 resets power supply with respect to the IC module 10 (step S45). In the IC module 10, when the power supply is reset, only a detection function can be performed. Meanwhile, in a case where the timer value does not satisfy the predetermined condition, the host 20 returns to the processing in step S43 and determines whether a transmission start signal is received.

As illustrated in FIG. 12, in a case where the IC module 10 is in post-communication state ST3, the host 20 performs the power source control method illustrated in FIG. 11. By the way, in post-communication state ST3, even if the CE device 30 is to shift to pre-communication state ST1 (communication standby state) after communication with the reader/writer 50 is finished, when a polling request electric wave transmitted from the reader/writer 50 is detected to detect other communication parties, there is a case where power supply may be continued. Especially, when the CE device 30 is left at the position in which the electric wave from the reader/writer 50 can be detected, it is not possible to semipermanently shift to pre-communication state ST1 and the power source is wasted for a long period.

In communicating state ST2, when detecting the transmission end of a predetermined electric wave, the IC module 10 supplies a transmission end signal to the host 20. When receiving the transmission end signal, the host 20 controls power supply with respect to the IC module 10 (the power supply amount is decreased) in order to shift to post-communication state ST3.

When the shift to post-communication state ST3 is caused, the host 20 starts the timer 16 according to the state shift. When detecting the predetermined electric wave to transmit the polling request, the IC module 10 supplies a transmission start signal to the host 20. The host 20 continuously determines whether the timer value satisfies the predetermined condition, until receiving the transmission start signal. When receiving the transmission start signal, the host 20 resets the timer value and restarts the timer 16. Also, although the detection of the presence of a simple electric wave can be performed by the detection result in the detection unit 12, the detection of the transmission start and transmission end of electric waves can be determined by comparison with detection information on the previous electric wave in the host 20.

Here, in a case where the CE device 30 is in the position in which it is possible to detect the electric wave of the reader/writer 50, after shifting to post-communication state ST3, the host 20 receives the transmission start signal within a predetermined period (the first period), and, after receiving the transmission start signal, receives the next transmission start signal within the predetermined period (the first period). In FIG. 10, the transmission start signals are received at the time of transmission of polling requests 1 and 2. Subsequently, every time the transmission start signal is received, the timer value is reset and the timer 16 is restarted. Therefore, in a case where the CE device 30 is in the position in which it is possible to detect the electric wave of the reader/writer 50, the host 20 determines that the timer value does not satisfy the predetermined condition. Therefore, in order to shift to pre-communication state ST1 (communication standby state), power supply with respect to the IC module 10 is not reset (the power supply amount is further decreased).

Meanwhile, in a case where the CE 30 is moved to a position in which it is not possible to detect the electric wave of the reader/writer 50, after shifting to post-communication state ST3, the host 20 cannot receive the first transmission start signal within the predetermined period (the first period), or, after receiving the transmission start signal, cannot receive the next transmission start signal within the predetermined period (the first period). In FIG. 10, it is not possible to receive a transmission start signal after transmission of polling request 2. Then, the host 20 cannot reset the timer value, the predetermined period (the first period) passes and it determines that the timer value satisfies the predetermined condition. Therefore, in so order to shift to pre-communication state ST1 (communication standby state), power supply with respect to the IC module 10 is reset (the power supply amount is further decreased).

[4. Summary]

As described above, according to the power source control method according to an embodiment of the present invention, in the IC module 10, when a result of timer determination based on detection information satisfies a predetermined condition in a state (pre-communication state ST1) to wait for the start of communication, power supply is controlled (the power supply amount is increased) to start communication. By this means, even if an electric wave is detected due to noise mixing or the like in pre-communication state ST1, the power supply amount is not increased to start communication as long as the predetermined condition is not satisfied. Also, the same applies to a case where an electric wave that is intermittently transmitted is detected.

Also, in a state to start communication (communicating state ST2), when a result of timer determination based on communication information satisfies a predetermined condition, power supply is controlled (the power supply amount is decreased) to terminate communication. By this means, even if an electric wave is detected from a different external apparatus in communicating state ST2, since the predetermined condition is satisfied, power supply is not erroneously continued. Also, if a normal communication packet is not received within a predetermined period, since power supply is controlled to terminate communication (the power supply amount is decreased), it is not necessary to continue the power supply for a certain period.

Also, in a state in which communication is terminated (post-communication state ST3), when a result of timer determination based on detection information satisfies a predetermined condition, it shifts to pre-communication state ST1 and power supply is reset to wait for the start of communication. By this means, even if a polling request electric wave directed to other communication parties is detected in post-communication state ST3, when a predetermined condition is satisfied, the power supply amount is not increased to start communication.

Therefore, by suppressing unnecessary power supply in pre-communication state ST1 (communication standby state), communicating state ST2 and post-communication state ST3, it is possible to efficiently supply a driving power source to the IC module 10.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

10 IC module
11 antenna coil
12 detection unit
13 communication unit
14 control unit
15 power source supply unit
16 timer
20 host (control unit)
30 CE device
50 reader/writer

The invention claimed is:

1. An information processing apparatus comprising:
   an IC module configured to communicate with an external apparatus;
   a detection unit configured to detect carrier wave transmission by the external apparatus;
   a power supply configured to supply a power source to the IC module; and
   a control unit configured to determine a start of the carrier wave transmission and control an amount of the power source,
   wherein the control unit is further configured to cause the information processing apparatus to transit to a standby state by lowering the power source when a first predetermined time elapses after an end of communication with the external apparatus without determining a start of the carrier wave transmission.

2. The information processing apparatus according to claim 1,
   wherein, the control unit is further configured to determine duration of the carrier wave transmission and cause the information processing apparatus to transit to a communication state by raising the power source when the duration matches a second predetermined time.

3. The information processing apparatus according to claim 2, wherein, the control unit is further configured to determine duration of no carrier wave transmission and cause the information processing apparatus to transit to a communication state by raising the power source when the duration matches a third predetermined time.

4. The information processing apparatus according to claim 2, wherein the control unit is further configured to cause the information processing apparatus to terminate a communication between the IC module and the external apparatus by lowering the power source when a third predetermined time elapses after the information processing apparatus transit to the communication state without receiving an appropriate communication packet, wherein the third predetermined time is longer than an application specific period.

5. The information processing apparatus according to claim 1,
   wherein, the control unit is further configured to determine duration of no carrier wave transmission and cause the information processing apparatus to transit to a communication state by raising the power source when the duration matches a second predetermined time.

6. The information processing apparatus according to claim 5, wherein the control unit is further configured to cause the information processing apparatus to terminate a communication between the IC module and the external apparatus by lowering the power source when a third predetermined time elapses after the information processing apparatus transit to the communication state without receiving an appropriate communication packet, wherein the third predetermined time is longer than an application specific period.

7. The information processing apparatus according to claim 1,
   wherein the control unit is further configured to cause the information processing apparatus to terminate a communication between the IC module and the external apparatus by lowering the power source when a second predetermined time elapses after the information processing apparatus transit to a communication state without receiving an appropriate communication packet, wherein the second predetermined time is longer than an application specific period.

8. A power source control method of an information processing apparatus, comprising:
   starting a timer when communication between an IC module and an external apparatus ends;
   restarting the timer when a carrier wave transmission starts; and
   lowering an amount of power supply to the IC module to cause the information processing apparatus to transit to a standby state when the timer lapses a predetermined time without determining a start of the carrier wave transmission.

9. A non-transitory computer readable medium storing a program configured to cause a computer to execute a power source control method of an information processing apparatus, comprising:
   starting a timer when communication between an IC module and an external apparatus ends;
   restarting the timer when a carrier wave transmission starts; and
   lowering an amount of power supply to the IC module to cause the information processing apparatus to transit to a standby state when the timer lapses a predetermined time without determining a start of the carrier wave transmission.

* * * * *